(12) United States Patent
Li

(10) Patent No.: US 8,114,354 B2
(45) Date of Patent: Feb. 14, 2012

(54) CATALYZED SOOT FILTER MANUFACTURE AND SYSTEMS

(75) Inventor: Yuejin Li, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 894 days.

(21) Appl. No.: 11/959,090

(22) Filed: Dec. 18, 2007

(65) Prior Publication Data

US 2009/0155134 A1    Jun. 18, 2009

(51) Int. Cl.
| | |
|---|---|
| B01D 50/00 | (2006.01) |
| B01J 23/00 | (2006.01) |
| B01J 21/00 | (2006.01) |
| B01J 20/00 | (2006.01) |

(52) U.S. Cl. ............ 422/180; 422/177; 502/66; 502/74; 502/87; 502/261; 502/262; 502/304; 502/327; 502/332; 502/333; 502/334; 502/339; 502/349; 502/350; 502/351; 502/355; 502/415; 502/439; 502/527.18; 502/527.19

(58) Field of Classification Search .............. 502/66, 502/74, 87, 261, 262, 304, 327, 332, 333, 502/334, 339, 349, 350, 351, 355, 415, 439, 502/527.18, 527.19; 422/177, 180
See application file for complete search history.

(56) References Cited

U.S. PATENT DOCUMENTS

| | | | |
|---|---|---|---|
| 4,532,228 A | | 7/1985 | Golino et al. |
| 4,585,752 A | * | 4/1986 | Ernest ........................ 502/304 |
| 5,605,553 A | * | 2/1997 | Connolly et al. ............... 55/487 |
| 5,902,363 A | * | 5/1999 | Connolly et al. ............... 55/487 |
| 6,342,192 B1 | * | 1/2002 | Andersson et al. ........ 423/213.5 |
| 6,613,299 B2 | * | 9/2003 | Dang et al. .................. 423/239.1 |
| 6,753,294 B1 | * | 6/2004 | Brisley et al. .................. 502/439 |
| 6,764,665 B2 | * | 7/2004 | Deeba et al. ............... 423/239.1 |
| 7,093,428 B2 | * | 8/2006 | LaBarge et al. ................. 60/286 |
| 7,097,817 B2 | * | 8/2006 | Brisley et al. .............. 423/245.3 |
| 7,166,555 B2 | | 1/2007 | Shustack |
| 7,229,597 B2 | | 6/2007 | Patchett et al. |
| 7,306,642 B2 | * | 12/2007 | Hayward et al. ................. 55/523 |
| 7,485,270 B2 | * | 2/2009 | Twigg et al. ............... 423/213.2 |
| 7,517,510 B2 | * | 4/2009 | Chen et al. .................. 423/213.2 |
| 7,550,117 B2 | | 6/2009 | Alward et al. |
| 7,566,426 B2 | * | 7/2009 | Zuberi ........................ 422/180 |

(Continued)

FOREIGN PATENT DOCUMENTS

EP    1398081 A1    3/2004

(Continued)

OTHER PUBLICATIONS

Non-Final Office Action in U.S. Appl. No. 11/959,048, mailed Jun. 14, 2010, 14 pgs.

(Continued)

*Primary Examiner* — Cam N. Nguyen

(74) *Attorney, Agent, or Firm* — Scott S. Servilla; Diehl Servilla LLC; Melanie L. Brown

(57) ABSTRACT

Catalyzed soot filters comprising a wall flow monolith having microcracks and pores and a catalyst comprising support particles with particle sizes greater than about the size of the microcracks and less than about the size of the pores are disclosed. Methods of manufacturing catalyzed soot filters and diesel engine exhaust emission treatment systems are also disclosed.

14 Claims, 4 Drawing Sheets

U.S. PATENT DOCUMENTS

| | | | |
|---|---|---|---|
| 7,572,416 B2 | 8/2009 | Alward et al. | |
| 7,601,662 B2 | 10/2009 | Bull et al. | |
| 7,673,448 B2 | 3/2010 | Voss et al. | |
| 7,722,829 B2 | 5/2010 | Punke et al. | |
| 7,740,817 B2* | 6/2010 | Matsumoto et al. | 423/213.2 |
| 7,740,819 B2* | 6/2010 | Morita et al. | 423/247 |
| 7,744,670 B2* | 6/2010 | Miao et al. | 55/523 |
| 7,749,472 B2* | 7/2010 | Chen et al. | 423/213.2 |
| 7,776,786 B2* | 8/2010 | DiFrancesco et al. | 502/439 |
| 7,807,110 B2* | 10/2010 | DiFrancesco et al. | 422/180 |
| 7,833,495 B2* | 11/2010 | Willey et al. | 422/180 |
| 7,977,275 B2 | 7/2011 | Pfeifer | |
| 2005/0031514 A1 | 2/2005 | Patchett et al. | |
| 2005/0042151 A1 | 2/2005 | Alward et al. | |
| 2005/0239642 A1* | 10/2005 | Kim et al. | 502/219 |
| 2006/0057046 A1* | 3/2006 | Punke et al. | 423/215.5 |
| 2006/0188416 A1 | 8/2006 | Alward et al. | |
| 2006/0270816 A1* | 11/2006 | Tao et al. | 526/317.1 |
| 2007/0014705 A1* | 1/2007 | Franklin Chen | 422/168 |
| 2007/0041881 A1 | 2/2007 | Voss et al. | |
| 2007/0104623 A1 | 5/2007 | Dettling et al. | |
| 2007/0271888 A9* | 11/2007 | Hayward et al. | 55/523 |
| 2008/0020922 A1* | 1/2008 | Li et al. | 502/73 |
| 2008/0032090 A1* | 2/2008 | Beall et al. | 428/116 |
| 2008/0038172 A1* | 2/2008 | Chen et al. | 423/213.2 |
| 2008/0045405 A1 | 2/2008 | Beutel et al. | |
| 2008/0081761 A1* | 4/2008 | Suzuki | 502/304 |
| 2008/0127638 A1 | 6/2008 | Vaarkamp et al. | |
| 2008/0132405 A1 | 6/2008 | Patchett et al. | |
| 2008/0141661 A1 | 6/2008 | Voss et al. | |
| 2008/0171650 A1 | 7/2008 | Alward et al. | |
| 2009/0155134 A1* | 6/2009 | Li | 422/177 |
| 2009/0155135 A1 | 6/2009 | Li | |
| 2009/0155525 A1* | 6/2009 | Li | 428/116 |
| 2009/0255241 A1 | 10/2009 | Patchett et al. | |
| 2009/0274602 A1 | 11/2009 | Alward et al. | |
| 2010/0170230 A1* | 7/2010 | Chiffey et al. | 60/297 |

FOREIGN PATENT DOCUMENTS

| | | |
|---|---|---|
| EP | 1710015 A1 | 10/2006 |
| WO | 2006/021337 A1 | 3/2006 |
| WO | 2006/021338 A1 | 3/2006 |
| WO | 2007/058867 A1 | 5/2007 |

OTHER PUBLICATIONS

Final Office Action in U.S. Appl. No. 11/959,048, mailed Dec. 10, 2010, 11 pgs.

Non-Final Office Action in U.S. Appl. No. 12/336,070, mailed Feb. 1, 2011, 14 pgs.

International Search Report, Application No. PCT/US2008/087245, Mar. 11, 2009.

* cited by examiner

CATALYZED SOOT FILTER MANUFACTURE AND SYSTEMS

TECHNICAL FIELD

Catalyzed soot filters for diesel engine exhaust emissions systems and methods for their manufacture and use are disclosed.

BACKGROUND

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of NOx.

Oxidation catalysts that contain platinum group metals, base metals and combinations thereof, are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOC's), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) also promote the oxidation of nitric oxide (NO) to $NO_2$. The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

One key aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus, the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Provisions are generally introduced to lower the soot burning temperature in order to provide for passive regeneration of the filter. The presence of a catalyst promotes soot combustion, thereby regenerating the filters at temperatures accessible within the diesel engine's exhaust under realistic duty cycles. In this way, a catalyzed soot filter (CSF) or catalyzed diesel particulate filter (CDPF) is effective in providing for >80% particulate matter reduction along with passive burning of the accumulating soot, and thereby promoting filter regeneration.

Conventional processes for coating diesel particulate filters on aluminum titanate and cordierite substrates often negatively impact the physical properties of the coated filter as compared to uncoated filters. It is believed that soluble and fine particles enter microcracks during the washcoating process. As a result, material in the microcracks limits the free movement of the microcracks and reduces the flexibility of the filter expansion upon heating. To minimize this issue, a polymer passivation step is used prior to washcoating the substrate. An example of such a polymer passivation step is described in U.S. Pat. No. 7,166,555. This polymer passivation step increases manufacturing cost and complexity. Accordingly, it would be desirable to provide methods for manufacturing catalyzed soot filters that do not require polymer passivation prior to washcoating.

SUMMARY

Catalyzed soot filters, methods for their manufacture and use and systems incorporating catalyzed soot filters are disclosed. In one embodiment, a catalyzed soot filter comprises a wall flow monolith having a plurality of longitudinally extending passages formed by longitudinally extending walls bounding and defining said passages, the passages comprising inlet passages having an open inlet end and closed outlet end, and outlet passages having a closed inlet end and an open outlet end, the wall flow monolith including microcracks having a width less than about 0.4 µm, and pores; and a washcoat disposed within the walls of the wall flow monolith, the washcoat including catalyst comprising support particles and at least one precious metal, where at least about 90% of the support particles have particle sizes greater than about the size of the microcracks and at least about 90% of the support particles have particle sizes less than about the size of the pores of the wall flow monolith.

In certain embodiments, the size of about 90% of the support particles are greater than about 0.5 µm. In other embodiments, the size of about 90% of the support particles are greater than about 1 µm. In still other embodiments, the size of about 90% of the support particles are greater than about 2 µm. In further embodiments, the size of about 90% of the support particles are less than about 15 µm. In still further embodiments, the size of about 90% of the support particles are less than about 10 µm.

In further embodiments, the size of about 90% of the support particles are less than about 7.5 µm. In other embodiments, the size of about 90% of the support particles are less than about 5 µm. According to one or more embodiments, the size of more than about 60% of the support particles are from about 1 to about 5 µm.

The support particles may be selected from aluminum compounds, zirconium compounds, cerium compounds, zeolites, silicon compounds, base metal oxides and combinations thereof. In one or more embodiments, the wall flow monolith comprises aluminum titanate having a porosity between about 40 and about 70% and a mean pore size between about 10 and about 25 µm. The soot filter of some embodiments exhibits a coefficient of thermal expansion less than about $25 \times 10^{-7}/°$ C. when measured at 1000° C. In other embodiments, the soot filter exhibits a coefficient of thermal expansion less than about $15 \times 10^{-7}/°$ C. when measured at 1000° C.

Another aspect of the invention pertain to a method of making a catalyst-coated wall flow monolith containing microcracks and pores, comprising providing a wall flow monolith having a plurality of longitudinally extending passages formed by longitudinally extending walls bounding and defining said passages, the passages comprising inlet passages having an open inlet end and closed outlet end, and outlet passages having a closed inlet end and an open outlet end and coating the wall flow monolith with a washcoat in the form of an aqueous slurry, which contains a thermally decomposable catalytic material and solid particles, at least about 90% of the particles have a particle size greater than about the size of the microcracks, and at least about 90% of the particles have a particle size less than about the size of the pores; and heating the coated wall flow monolith to a temperature sufficient dry the washcoat.

DETAILED DESCRIPTION

Figure 1:
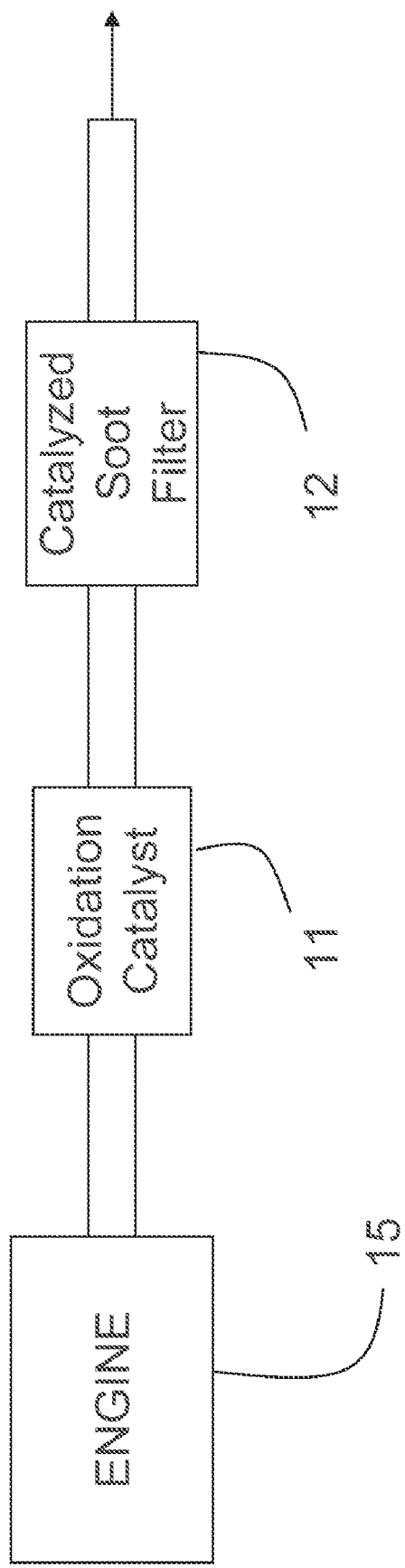
FIG. 1 shows a schematic depiction of an embodiment of an emission treatment system.

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a catalyst" includes a mixture of two or more catalysts, and the like.

Aspects of the invention pertain to catalyzed soot filters, diesel engine exhaust treatment systems including a catalyzed soot filter and methods of making catalyzed soot filters. One or more embodiments of the invention relates to a coating process for making catalyzed soot filters for use as part of an emission treatment system.

A method for applying a catalyst composition to a soot filter is provided that results in a catalyzed soot filter having physical properties superior to the blank filter without using a polymer passivation step prior to application of the washcoat. The catalyzed soot filters comprise a wall flow monolith and a washcoat including catalyst. The wall flow monolith has a plurality of longitudinally extending passages formed by longitudinally extending walls bounding and defining the passages. The passages comprise inlet passages having an open inlet end and closed outlet end, and outlet passages having a closed inlet end and an open outlet end. The wall flow monolith has microcracks with a width less than about 0.4 µm, and pores. The catalyst comprises support particles and at least one precious metal. At least about 90% of the support particles have particle sizes greater than about the size of the microcracks, and at least about 90% of the support particles have particle sizes less than about the size of the pores of the wall flow monolith.

Other aspects of the invention are directed toward methods of making a catalyst coated wall flow monolith containing microcracks and pores. According to one or more embodiments, the methods include coating a wall flow monolith with a washcoat in the form of an aqueous slurry. The aqueous slurry may contain a thermally decomposable catalytic material comprising support particles. The support particles are present in a range of sizes where at least about 90% of the particles are greater than about the size of the microcracks, and at least about 90% of the particles are less than about the size of the pores. The coated wall flow monolith may be heated to a temperature which is sufficient to provide a deposit of catalytically-active compounds on the monolith surface.

In some embodiments, at least about 90% of the support particles are greater than about 0.5 µm. In specific embodiments, the support particles greater than about 1 µm, and in more specific embodiments, the support particles greater than about 2 µm. In certain embodiments, at least about 90% of the support particles are less than about 15 µm. In specific embodiments, the support particles are less than about 10 µm, and in more specific embodiments, the support particles are, less than about 7.5 µm. In most specific embodiments, the support particles are less than about 5 µm. In other embodiments of the invention, more than about 60% of the support particles are within the range of about 1 µm to about 5 µm.

One embodiment of an emission treatment system is schematically depicted in FIG. 1. As can be seen in FIG. 1, the exhaust containing gaseous pollutants (including unburned hydrocarbons, carbon monoxide and NOx) and particulate matter is conveyed from the engine 15 to an oxidation catalyst 11. In the oxidation catalyst 11, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the soot filter 12 (i.e., clogging), which is positioned downstream in the system. In addition, a substantial proportion of the NO of the NOx component is oxidized to $NO_2$ in the oxidation catalyst.

The exhaust stream is conveyed to the soot filter 12 which is coated with a catalyst composition. According to one or more embodiments, the particulate matter including the soot fraction and the VOF are also largely removed (greater than 80%) by the soot filter. The particulate matter deposited on the soot filter is combusted through the regeneration of the filter. The temperature at which the soot fraction of the particulate matter combusts is lowered by the presence of the catalyst composition disposed on the soot filter. The catalyzed soot filter 12 may optionally contain an SCR catalyst for converting the NOx in the exhaust gas stream to nitrogen.

Wall flow substrates useful for supporting the catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain greater than about 300 cell per square inch, and up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Figure 2:
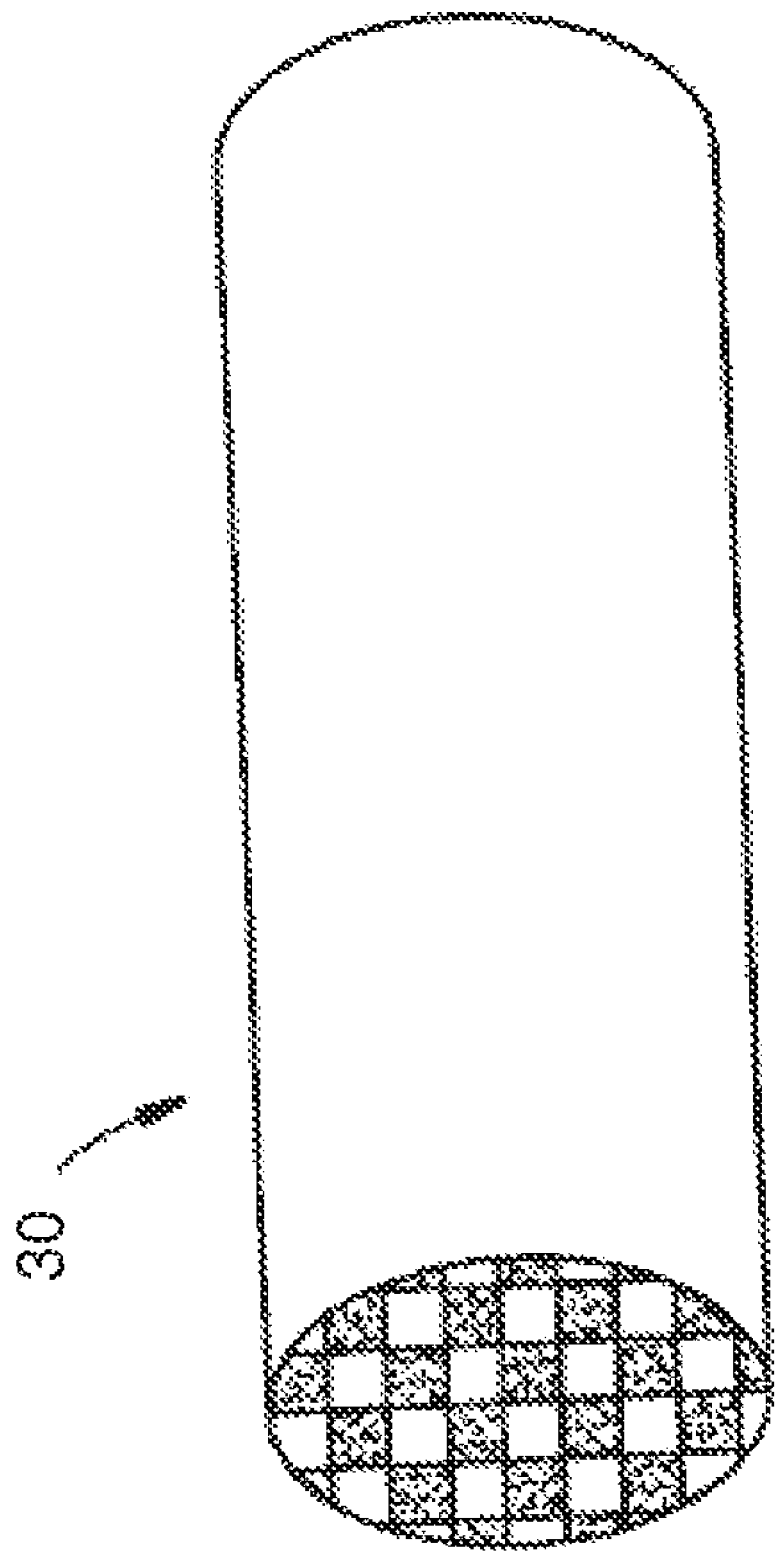
FIG. 2 shows a perspective view of a wall flow filter substrate.
Figure 3:
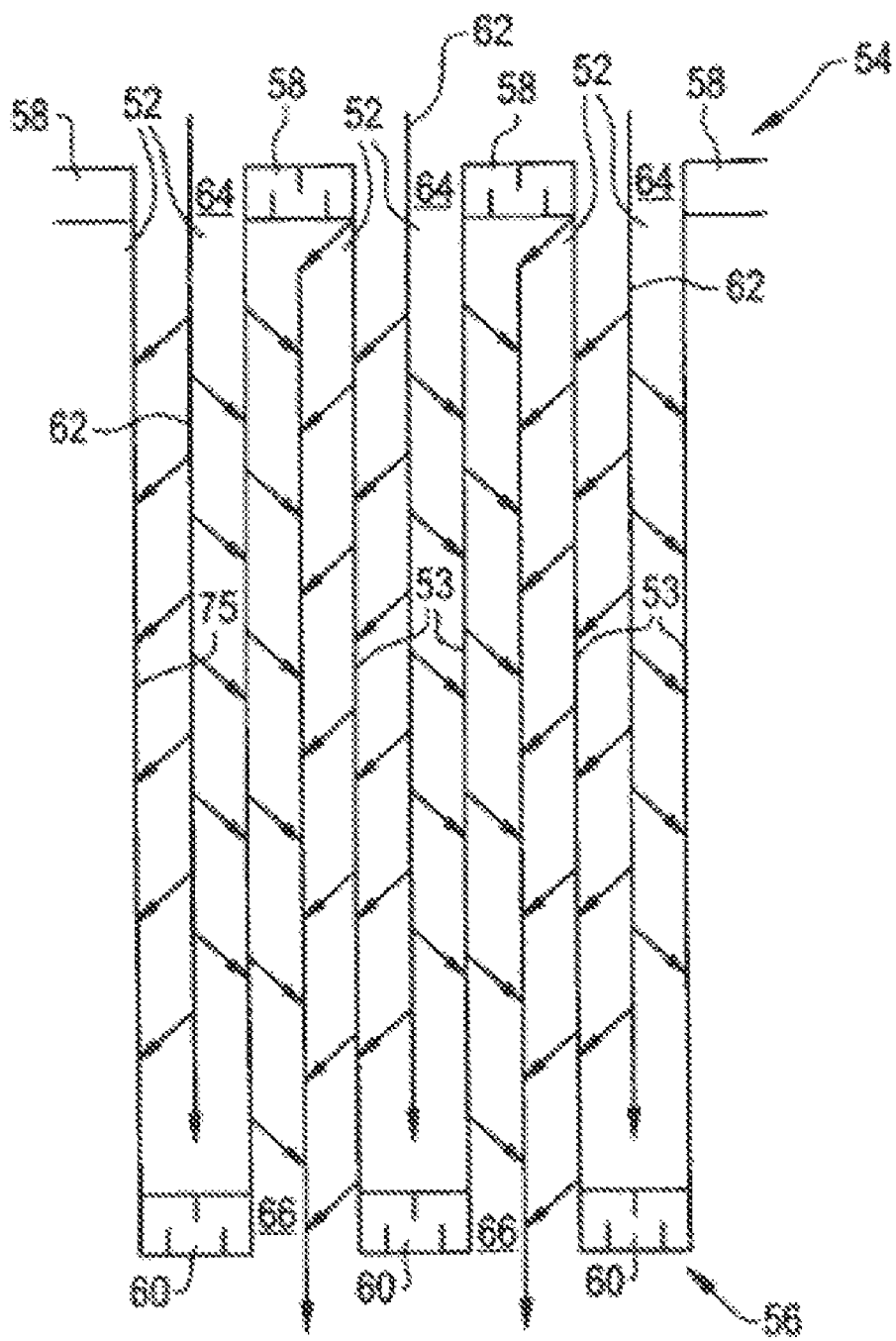
FIG. 3 shows a cutaway view of a section of a wall flow filter substrate.

FIGS. 2 and 3 illustrate a wall flow filter substrate 30 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. The wall flow monolith of other embodiments is one or more of aluminum titanate, cordierite, metal oxides and ceramics.

Various embodiments of the invention comprise an aluminum titanate wall flow monolith, having a porosity between about 40 and about 70% and a mean more size between about 10 and about 25 μm. Further embodiments of this sort have a coefficient of thermal expansion that is preferably less than about $25 \times 10^{-7}$/° C., and more preferably less than about $15 \times 10^{-7}$/° C. when measured at 1000° C.

Coating of the wall flow substrates with catalyst composition is achieved by immersing the substrates vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300° C. to 450° C.). After calcining, the catalyst loading can determined be through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

The catalyst is dispersed on a suitable support material such as a refractory oxide with high surface area and good thermal stability such as a high surface area aluminum oxide. Also, aluminas stabilized with a second oxide are suitable supports. Lanthana stabilization of alumina provides a suitable support for precious group metal catalysts. Also, mixtures of aluminas are suitable supports. Other aluminas that are doped or treated with oxides such as $SiO_2$, $ZrO_2$, $TiO_2$, etc. to provide stabilization or improved surface chemistries can also be utilized. Other suitable support materials include, but are not limited to, $ZrO_2$ and $TiO_2$, can be used. In addition to the support oxides discussed above, it might prove useful to include other catalytically functional oxides to incorporate into the catalytic zone. Examples of these include $CeO_2$, $Pr_6O_{11}$, $V_2O_5$, and $MnO_2$ and combinations thereof and solid solution oxide mixtures, etc. These oxides can contribute to burning of hydrocarbons, especially heavy fuel derived hydrocarbons, and deposited coke/soot derived from disproportination (i.e., dehydrogenation or oxidative dehydrogenation) of the injected fuel and in this way give additional combustion activity to the catalytic zone, plus prevent deactivation of the PGM by the deposition hydrocarbon derived coke.

EXAMPLES

The following examples further illustrate the present invention, but of course, should not be construed as in any way limiting its scope.

Sample Preparation

The filter substrate for the following samples is made of aluminum titanate with a porosity of 51% of the mean pore size between 14 μm and 15 μm, 300 cpsi and a wall thickness of 13 mil. The substrate has a dimension of 2"×6" round.

Comparative Example A

The reference example catalyst has the following composition: 33.3 g/ft³ Pt, 16.7 g/ft³ Pd, 0.5 g/in³ Siralox 1.5/100 (1.5% Si on $Al_2O_3$) and 0.1 g/in³ beta zeolite. The composition is the same throughout the length of the filter.

To prepare the catalyst coating slurry, a platinum tetra monoethanolamine hydroxide solution was impregnated onto Siralox powder via the incipient wetness technique in a Planetary mixer. Then, palladium nitrate was applied on the Pt/Siralox powder using the same impregnation technique. The precious metal impregnated powder was then dispersed into water to make a slurry. This slurry was milled using a continuous mill to reduce the particle size to 90% less than 4 micrometers ($D_{90}$<4 μm). Before the completion of milling, zeolite was added into the slurry. The resulting slurry was further diluted with water to achieve 19% solids by weight. The final pH of the slurry was 4.1.

The slurry was then washcoated by immersing the substrate into the slurry with inlet side of the substrate down and the outlet side just above (about ¼ inch) the slurry level. The substrate was pulled out of the slurry, and a stream of air was blown from the outlet side until no washcoat slurry was coming out. The coated sample was then dried at 110° C. for 2 hours and calcined in air at 450° C. for 1 hour.

Example B

A Ce/Zr composite (0.3 g/in³) with $D_{90}$<4 μm was used for this example. The Ce/Zr powder was used without further reducing the particle size. The slurry was washcoated in a similar manner as Example A.

Example C

The ammonium form of ZSM-5 (0.3 g/in$^3$) with $D_{90}$<13 µm was used for this sample. The zeolite powder was used without further reducing the particle size. The slurry was washcoated in a similar manner as Example A.

Example D

A Siralox 1.5 powder (0.1 g/in$^3$) milled to $D_{90}$<5 µm was used for this sample. The slurry was washcoated in a similar manner as Example A.

Example E

A Siralox 1.5 powder (0.3 g/in$^3$) was used for this sample. The powder was milled to $D_{90}$<6 µm with tartaric acid added before milling. The slurry was washcoated from both the inlet and outlet sides to get the total washcoat loading of 0.3 g/in$^3$.

Example F

A jet milled alumina powder was used, which has a $D_{90}$<7 µm. This alumina powder was further milled in a continuous mill to $D_{90}$<5 µm. The slurry was coated from the inlet side to achieve a 0.40 g/in$^3$ washcoat.

Figure 4:
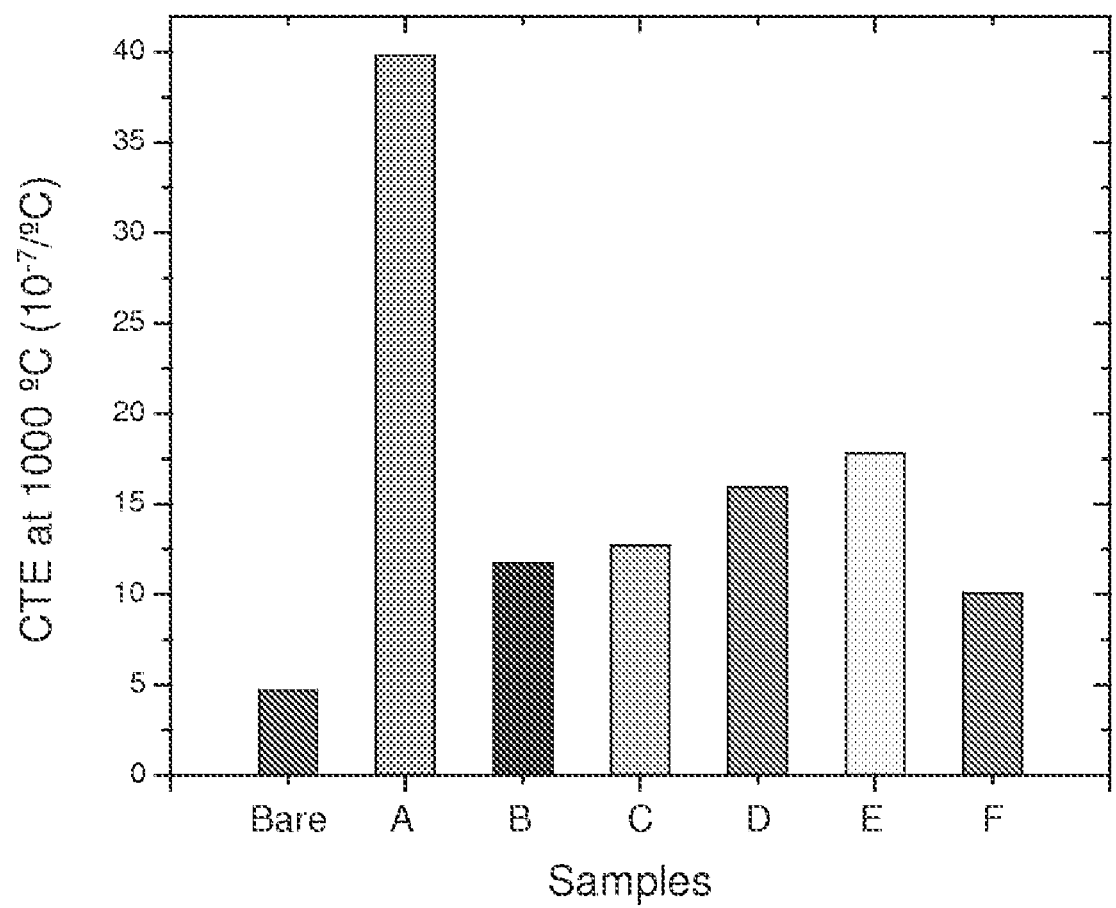
FIG. 4 shows a graph of the coefficient of thermal expansion for exemplary wall flow substrates.

FIG. 4 shows a chart of the coefficient of thermal expansion (CTE) for Examples (Samples) A-F. These measurements were performed at 1000° C. A lower CTE is indicative of a more robust catalyzed soot filter. All of the milled samples (Examples B-F) demonstrate CTEs lower than the Comparative Example A. Catalyzed soot filters with CTEs below $15\times10^{-7}$/° C. have been observed to be robust. CTEs between $15\times10^{-7}$ and $25\times10^{-7}$/° C. are being investigated for robustness. All of the milled samples have CTEs below $25\times10^{-7}$/° C., with most being below $15\times10^{-7}$/° C.

Accordingly, while the present invention has been disclosed in connection with various embodiments thereof, it should be understood that other embodiments might fall within the spirit and scope of the invention, as defined by the following claims.

Reference throughout this specification to "one embodiment," "certain embodiments," "one or more embodiments" or "an embodiment", means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

The invention claimed is:

1. A catalyzed soot filter comprising:
   a wall flow monolith having a plurality of longitudinally extending passages formed by longitudinally extending walls bounding and defining said passages, the passages comprising inlet passages having an open inlet end and closed outlet end, and outlet passages having a closed inlet end and an open outlet end, the wall flow monolith including microcracks having a width less than about 0.4 µm, and pores; and
   a washcoat disposed within the walls of the wall flow monolith, the washcoat including catalyst comprising support particles and at least one precious metal, where at least about 90% of the support particles have particle sizes greater than about the size of the microcracks and at least about 90% of the support particles have particle sizes less than about the size of the pores of the wall flow monolith.

2. The catalyzed soot filter of claim 1, wherein the size of about 90% of the support particles are greater than about 0.5 µm.

3. The catalyzed soot filter of claim 1, wherein the size of about 90% of the support particles are greater than about 1 µm.

4. The catalyzed soot filter of claim 1, wherein the size of about 90% of the support particles are less than about 10 µm.

5. The catalyzed soot filter of claim 1, wherein the size of about 90% of the support particles are less than about 5 µm.

6. The catalyzed soot filter of claim 1, wherein the size of more than about 60% of the support particles are from about 1 to about 5 µm.

7. The catalyzed soot filter of claim 1, wherein the support particles are selected from the group consisting of aluminum compounds, zirconium compounds, cerium compounds, zeolites, silicon compounds, base metal oxides and combinations thereof.

8. The catalyzed soot filter of claim 1, wherein the wall flow monolith comprises aluminum titanate having a porosity between about 40 and about 70% and a mean pore size between about 10 and about 25 µm.

9. The catalyzed soot filter of claim 8, wherein the soot filter exhibits a coefficient of thermal expansion less than about $25\times10^{-7}$/° C. when measured at 1000° C.

10. The catalyzed soot filter of claim 8, wherein the soot filter exhibits a coefficient of thermal expansion less than about $15\times10^{-7}$/° C. when measured at 1000° C.

11. The catalyzed soot filter of claim 1, wherein the wall flow monolith comprises aluminum titanate.

12. The catalyzed soot filter of claim 1, wherein the wall flow monolith comprises cordierite.

13. The catalyzed soot filter of claim 1 wherein the precious metal is platinum.

14. The catalyzed soot filter of claim 1 wherein the precious metal is palladium.

* * * * *